United States Patent

[11] 3,628,172

[72] Inventors Edwin Matovich
Brea;
David E. O'Grady, Yorba Linda, both of Calif.
[21] Appl. No. 21,060
[22] Filed Mar. 19, 1970
[45] Patented Dec. 14, 1971
[73] Assignee North American Rockwell Corporation

[54] HIGH-POWER DISSIPATION LASER SEGMENT MOUNTING HOLDERS
6 Claims, 6 Drawing Figs.

[52] U.S. Cl.................................................. 331/94.5, 350/69
[51] Int. Cl..................................................... H01s 3/00, G02h 7/02
[50] Field of Search........................................... 331/94.5; 350/61–67, 69, 39

[56] References Cited
UNITED STATES PATENTS
3,569,860  3/1971  Booth........................... 331/94.5

*Primary Examiner*—Ronald L. Wibert
*Assistant Examiner*—Conrad Clark
*Attorneys*—L. Lee Humphries, H. Fredrick Hamann and Edward Dugas ABSTRACT: The holders of the present invention are used to maintain the distance between segments of laser material so as to provide a fluid path for a cooling fluid across the surfaces of the laser material segments. The holders are formed in the shape of an elliptical ring having an elliptical opening defined through the center thereof with the ring being adapted to receive an elliptical disc of laser material. The ring is provided with a recessed portion on at least one surface to form a passageway for fluid across the face of the disc of laser material. Spacer means are positioned in recesses on the surface of the elliptical ring to hold each disc of laser material in place and to allow stacking of a plurality of the rings in axial alignment while maintaining a uniform spacing between a plurality of elliptical discs. The invention described herein was made in the performance of work under Air Force Contract No. AF33(615)68C-1104.

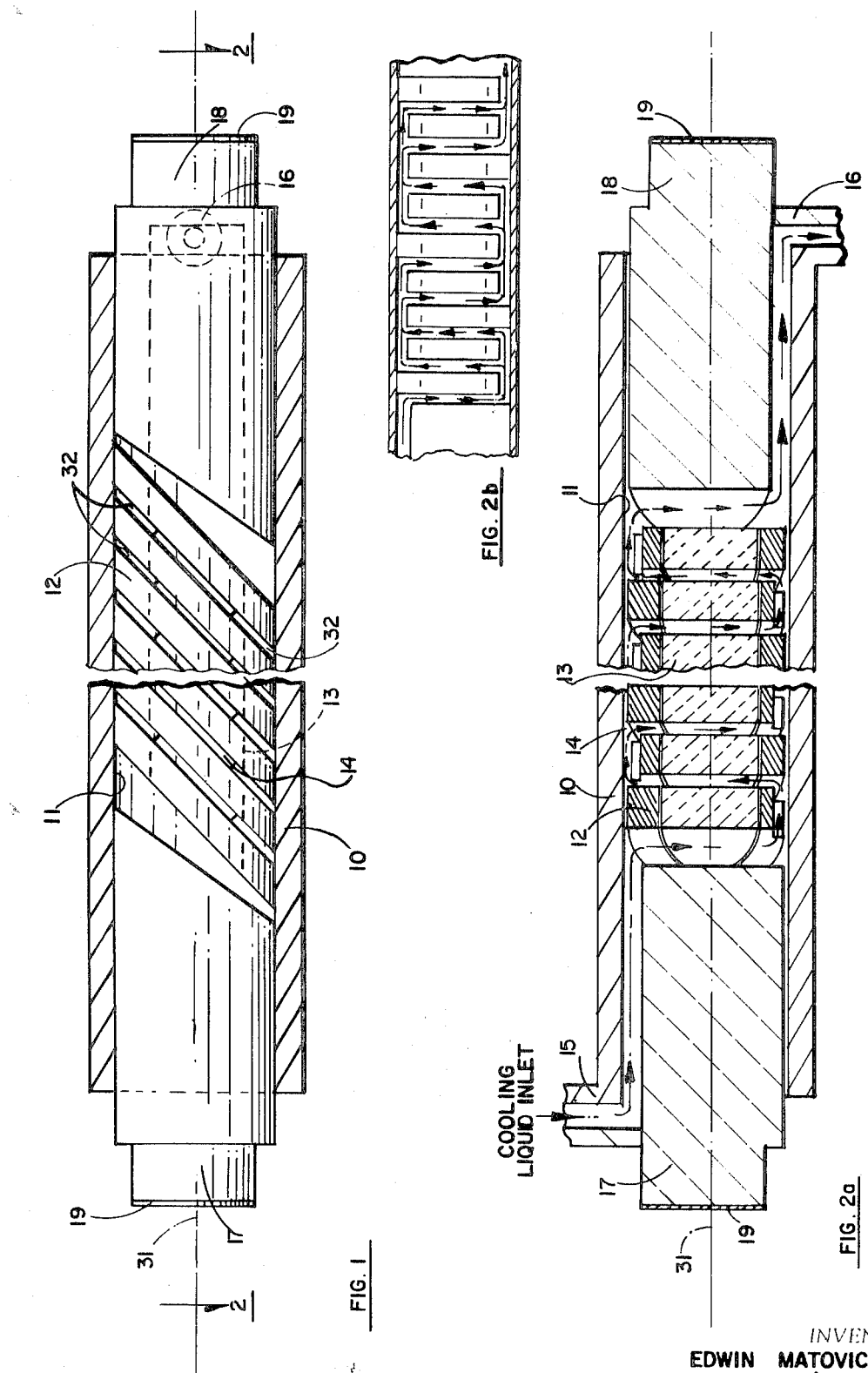

INVENTORS
EDWIN MATOVICH
DAVID E. O'GRADY
BY
Edward Dugas
ATTORNEY

INVENTORS
EDWIN MATOVICH
DAVID E. O'GRADY
BY
Edward Dugas
ATTORNEY

HIGH-POWER DISSIPATION LASER SEGMENT MOUNTING HOLDERS

BACKGROUND OF THE INVENTION

The following patents are believed to be pertinent prior art to the present invention:

U.S. Pat. No. 3,487,330, entitled "High Power Dissipation Laser Structure," by R. A. Gudmundsen U.S. Pat. No. 3,311,848, entitled "Polarizing Apparatus Using Inclined Plates of Laserable Material," by G. R. Simpson et al.

The present invention is directed to a holder which has particular utility in high average power axial gradient-type lasers which use segmented discs to form the laser element. More specifically, the holder allows the laser discs to be stacked in a rigid manner along an optical axis while providing a passageway between each of the discs for a cooling liquid. In the laser art, the pulse repetition rate for high average powered lasers is limited by the amount of heat that can be dissipated from the laser material between each pulse. Liquid laser systems have been suggested as one approach in overcoming the operational limitations imposed by the heat dissipation but these types of lasers suffer from other problems related to viscosity, quantum parameters of the liquids, chemical stability and corrosion. One particular solution to the heat dissipation problem is disclosed in U.S. Pat. NO. 3,487,330, entitled "High Power Dissipation Laser Structure," by Richard A. Gudmundsen, which patent is assigned to North American Rockwell Corporation, the assignee of the present invention. In that patent there is disclosed a high-power dissipation laser in which the laser material is segmented into discs located along the optical axis of the laser cavity such that the major faces of each disc are parallel to its adjacent neighbor and wherein each disc intersects the optical axis of the cavity at the Brewster angle. The discs are each spaced apart to provide a fluid passageway through which a cooling fluid in pumped to dissipate the heat generated during laser operation. The discs are each spaced apart to provide a fluid passageway through operation. One of the problems encountered with manufacturing this particular type laser structure is the problem encountered with the accurate spacing and the maintaining of each disc in a parallel orientation along the optical axis of the laser in the face of large temperature gradients. Each of the discs must be maintained in an accurate position with respect to the remaining discs, otherwise the output of laser is degraded.

One device that has been used in the prior art to accomplish this spacing involves a tru-bore tubing with a series of slots carefully cut so that the laser segments fit into the slots with a second, closely fitting tube passed over the first tubing so as to hold the assembly together; with the second tubing having cuts through it to provide a serial fluid flow path between the segments. The major difficulty involved with this prior art holding device is that the mechanical fabrication of the slotted tubing is/was almost beyond the glass-cutting art to achieve the necessary levels of tolerance for making an acceptably operable laser. Also, the assembly was a serial process involving considerable skill and technician time. It was, therefore, highly desirable to make individual units consisting of the discs of active laser material and the mechanical holders along with the laser material spacer so that it was only necessary to drop these units into a tru-bore tube to assemble the laser. It was also necessary to configure these units so that as they were placed in the tru-bore tube, they automatically came into correct optical alignment with each other. It was also necessary to provide a holder and liquid-cooling passage which did not involve altering the configuration of the laser discs because, in order to achieve a high-grade optical output, extreme care has to be taken with the polishing of the surface of each of the laser segments. For example, in the present laser device, the laser discs have a surface roughness on the order of 0.3 microinches. If notches or other surface irregularities are introduced, they would impede the grinding and polishing processes, making it impossible to achieve the desired surface finish mentioned above.

SUMMARY OF THE INVENTION

In the preferred embodiment of the invention, an elliptically shaped holder has its external edge surface formed at an angle so that the holder positions itself with its edges parallel to the inside diameter of a hollow cylindrical tube such that the holder is positioned to intersect the longitudinal axis of the cylindrical tube at the Brewster angle. The holder defines an elliptical opening through its center, which opening is adapted to receive a corresponding elliptical disc of laser material. Each holder has a recessed portion on at least one of its face surfaces to form a passageway for fluid across the face of the disc of laser material. Spacer means project radially inward towards the laser optical axis from the surface of each elliptical holder to hold each disc of laser material in place and to allow stacking of a plurality of holders in axial alignment while maintaining a uniform spacing between elliptical discs of laser material even though the thickness tolerance for each holder is greater than the tolerance for the spacing of each disc. At least one edge of each elliptical holder is recessed to provide an additional path for the cooling liquid.

Accordingly, it is an object of the present invention to provide an improved holder for holding laser segments.

It is a further object of the present invention to provide a holder which will maintain discs of laser material in a fixed parallel relationship with a desired spacing between each of the discs.

It is another object of the present invention to provide a holder which, when stacked with other similar holders in a hollow cylindrical tube, will automatically align itself in an angular position which is constant throughout the length of the tube.

These and other objects of the present invention will become more apparent and better understood when taken in conjunction with the following description and the accompanying drawings, throughout which like characters indicate like parts and which drawings form a part of this application.

BRIEF DESCRIPTION OF THE DRAWINGS

FIG. 1 illustrates in a sectioned view a laser utilizing the holder of the present invention;

FIG. 2A illustrates a sectioned view of the laser of FIG. 1 taken along the section lines 2—2;

FIG. 2B illustrates a second configuration for the laser discs of FIG. 2A;

DESCRIPTION OF THE PREFERRED EMBODIMENT

Figure 4:
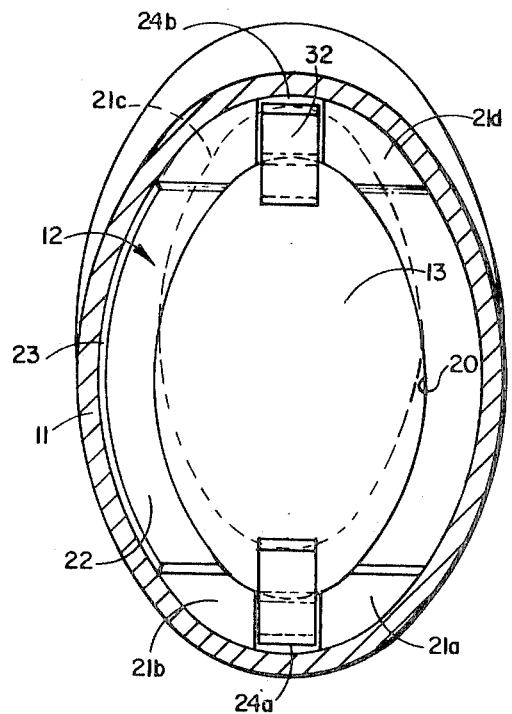
FIG. 4 is a section view of the embodiment shown in FIG. 3, taken along the section lines 4—4.

Referring to FIGS. 1, 2A and 2B, there is shown a typical liquid-cooled axial gradient laser 10 without the laser pumping means. In the laser shown, a cylindrical holding tube 11 supports a plurality of elliptically shaped holders 12 along the optical axis 31 of the laser. Optical end members 17 and 18 fit into the inside diameter of the tube 11 to form a liquidtight structure. Elliptical discs of laser material 13 are held in place by holder 12 along the optical axis 31 so that they intersect the optical axis 31 at the Brewster angle. Spacing means 32 are positioned at the top and bottom of each holder to provide accurate parallel spacing of each laser disc 13, The space 14 between each laser disc forms a fluid passageway. A cooling liquid is pumped into the laser cavity through tube 15 and traverses the length of the laser in a serial manner by passing through the passages 14 and along the length of the laser cavity to the cooling liquid outlet 16. The passages may also be configured so that the coolant flows in series between parallel grouping of two or more channels, as shown schematically in FIG. 2A. In the completed operating laser system, means are provided for pumping the liquid through the laser and for either adding cooling liquid or for cooling the heated liquid. Positioned on the outer surface of each optical end piece 17 and 18 may be mirrors 19 which form the optical resonant cavity of the laser. One of the mirrors may be partially silvered to allow a portion of the generated light to leave the cavity. External mirrors may be used in place of the mirrors 19. The arrangement of mirrors and reflecting surfaces for forming laser cavities is well known in the prior art.

Figure 3:
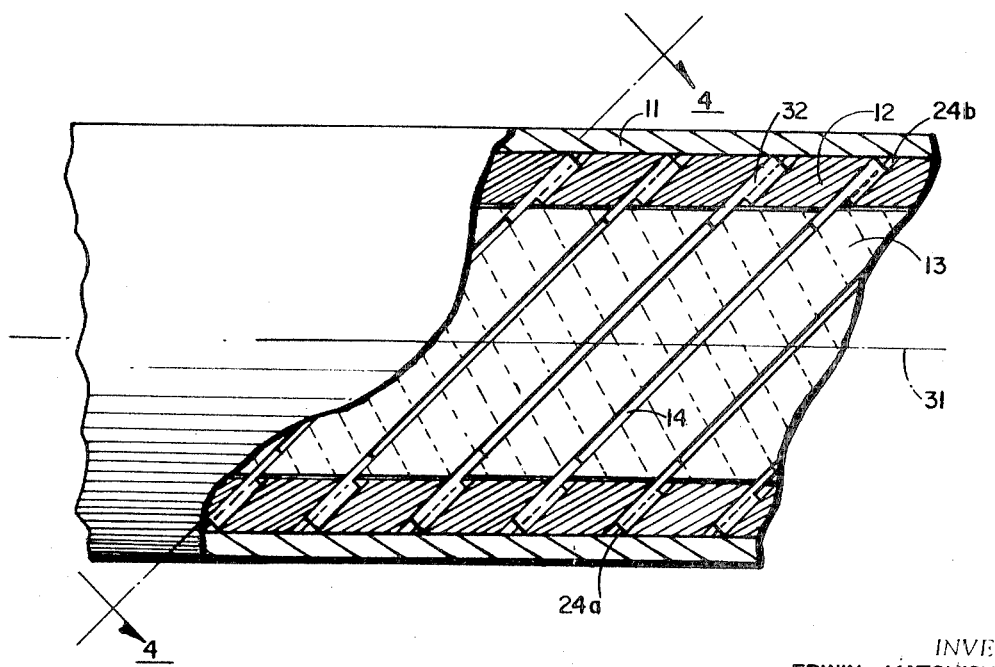
FIG. 3 is an enlarged section view of a portion of the embodiment shown in FIG. 1.

Referring now to FIGS. 3 and 4, the laser element holder 12 is formed from a Pyrex or other similar type of material which is relatively insensitive to wide temperature ranges. The main requirement imposed on the material is that it retains dimensional stability under wide-operating temperature ranges. The holder is formed in the shape of an ellipse having an elliptical opening 20 and defined through the center. A recessed portion 22 on the face surface of the holder 12 provides a fluid passageway when abutted against the back surface of an adjacent holder. A recess 23 is provided on at least one edge of the holder 12 to provide the longitudinal passageway for the cooling liquid from one adjacent holder to another. The four projections 21a to 21d, formed by recess 22 and notches 24a and 24b, project forward from one surface for adjacent holders as each is stacked in the cylindrical holding tube 11. The notches 24a and 24b are provided to hold a spacer means 32 which means ensures the accurate parallel spacing of each laser disc 13.

The cylindrical holding tube 11, which is transparent to the pumping frequency, is shown with the holder 12 intersecting the laser's optical axis 31 at the Brewster angle. The top and bottom edge 43 of the elliptical holder are chamfered to provide a close parallel fit with the holding tube 11 without binding when the elliptical shape ensures that when two or more holders are stacked within the holding tube 11 and a light pressure is applied from both ends that each holder will align itself in the same angular orientation as its adjacent neighbor.

Figure 5:
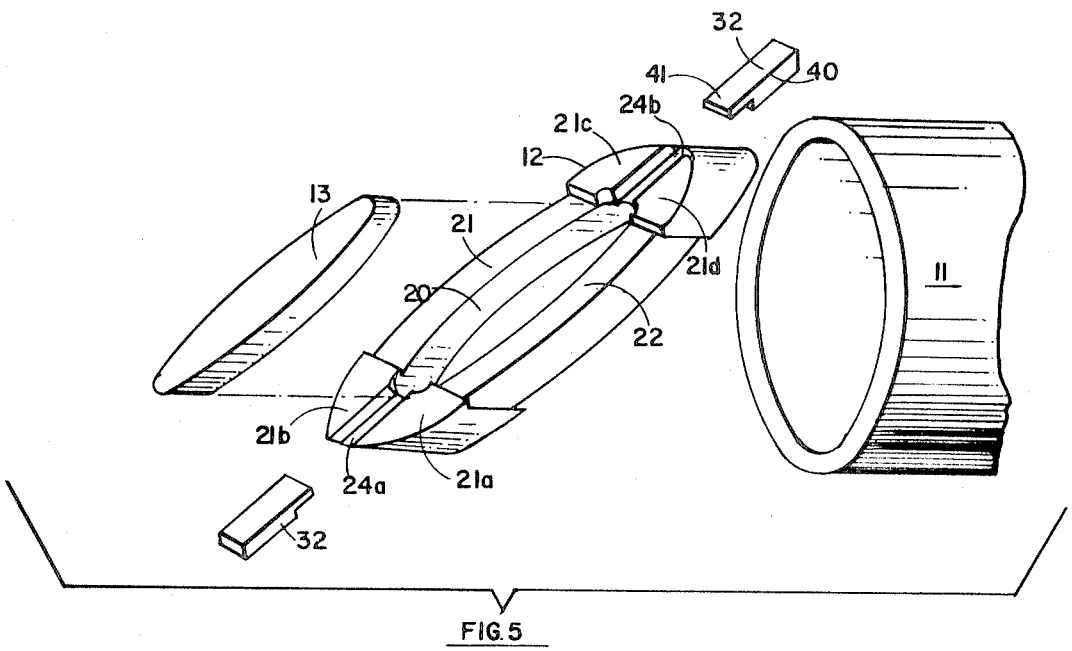
FIG. 5 is a exploded view of a portion of the laser of FIG. 1.

FIG. 5 is an exploded prospective view of the holding and spacing means and their relative positions as they are assembled into the holding tube 11. The recessed portion 22 across the face of the holder 12 allows the fluid flow to pass across the face of the disc 13. The projecting sections 21a to 21d butt against the back surface of each adjacent holder to form a rigid structure when aligned win the holding tube 11. The solid spacer means 32 is formed with a relatively wide section 40 and a narrower flat section 41. The thickness of the narrower section is equal to the exact spacing desired between each of the laser discs. The thicker section 40 is used to prevent the spacer from falling between each of the discs. The spacer may be made from Pyrex glass, quartz, ceramics, gold, silver, nickel, stainless steel or any material which is thermally compatible with the laser structure.

While there is shown what are considered to be the preferred embodiments of the present invention, it will be manifest that many changes and modifications may be made therein without departing from the essential spirit of the invention. It is intended, therefore, in the annexed claims, to cover all such changes and modifications as fall within the true scope of the invention.

What is claimed is:

1. In a liquid-cooled axial gradient laser having a plurality of laser discs forming the active laser element with the discs positioned along the optical axis of the laser the improvement comprising:
   a holding tube;
   an elliptical ring having an elliptical opening defined through the center thereof, said ring adapted to receive an elliptical disc of laser material, said ring having recessed portions on one surface and at least one edge thereof to provide a passageway for fluid across the face of the disc of laser material, said elliptical ring having spacer means projecting from one surface thereof to allow stacking of a plurality of said rings in axial alignment within said holding tube while maintaining a uniform parallel spacing between said plurality of rings.

2. In a liquid-cooled axial gradient laser having a plurality of laser discs forming the active laser element with the discs positioned along the optical axis of the laser, the improvement comprising:
   a holding tube;
   a plurality of holders, one associated with each laser disc, positioned within said holding tube, each of said holders being shaped as an elliptical ring defining an elliptical opening adapted to receive a laser disc, a recess across the face of said elliptical ring to allow for the passage of the cooling liquid across the face of each laser disc;
   a recess along one edge of each of said plurality of holders adjacent said holding tube to allow for the passage of cooling liquid along the optical axis of the laser; and
   spacer means for restraining each laser disc within holder means and for fixing the spacing between said laser discs.

3. The invention according to claim 2 wherein said spacer means is a segmented spacer having a projecting section, the thickness of which is equal to the desired spacing between each laser disc and which projecting segment projects towards the optical axis of the laser between each laser disc, said spacer means having a thicker section for preventing said spacer from falling between said laser discs.

4. The invention according to claim 3 wherein said plurality of holders each has at least two recessed sections for receiving a spacer means, said recess having a depth slightly greater than the thickness of the thicker section of said segmented spacer so as to allow each of said holders to contact adjacent holders.

5. The invention according to claim 2 wherein the edge which is recessed on each of said plurality of holders is staggered so as to provide a plurality of serial liquid paths along the length of the laser.

6. The invention according to claim 2 wherein the edge which is recessed in each one of said plurality of holders is staggered in at least pairs of two so as to provide a plurality of parallel-serial liquid paths along the length of the laser.

* * * * *